Patented Mar. 21, 1933

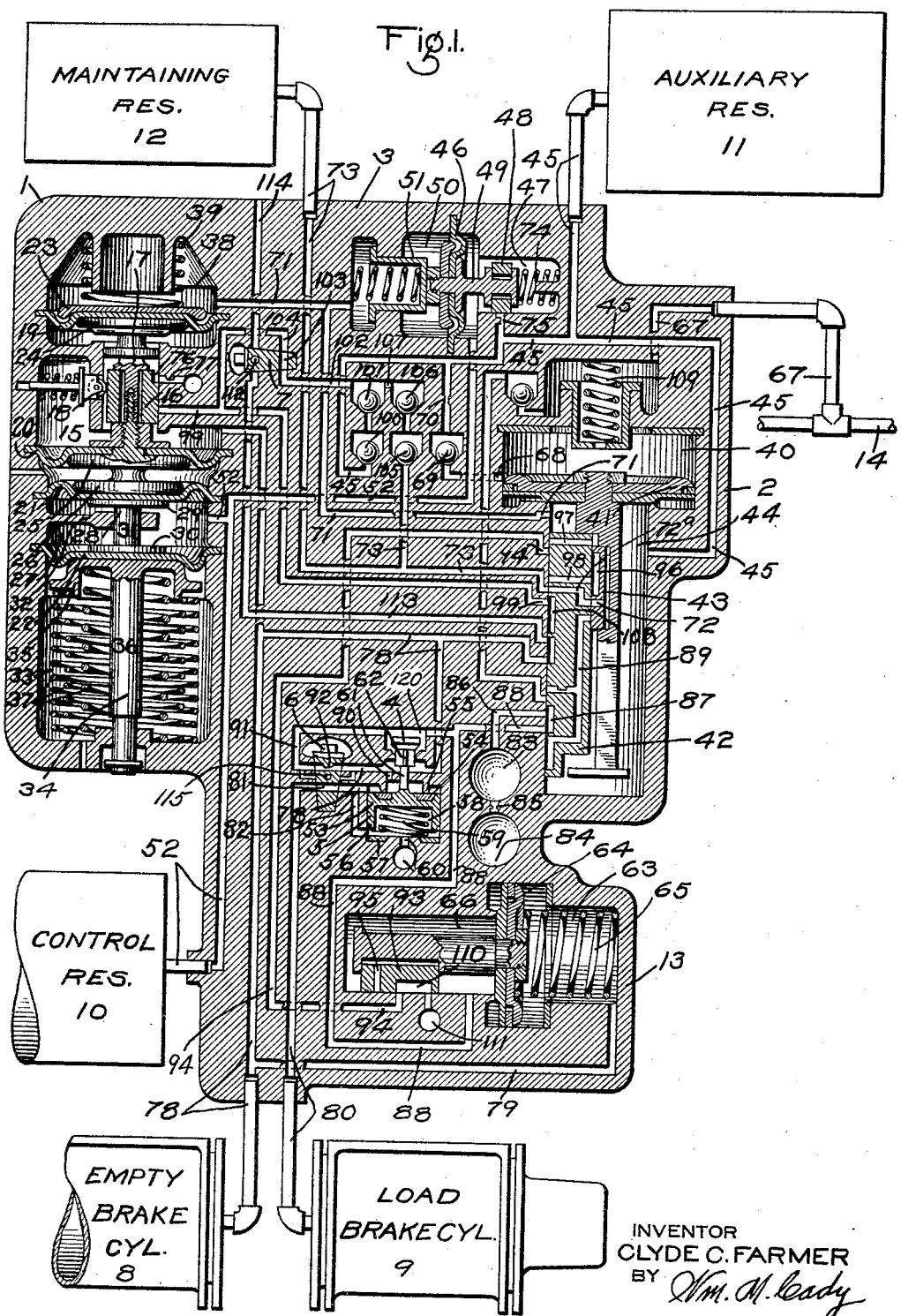

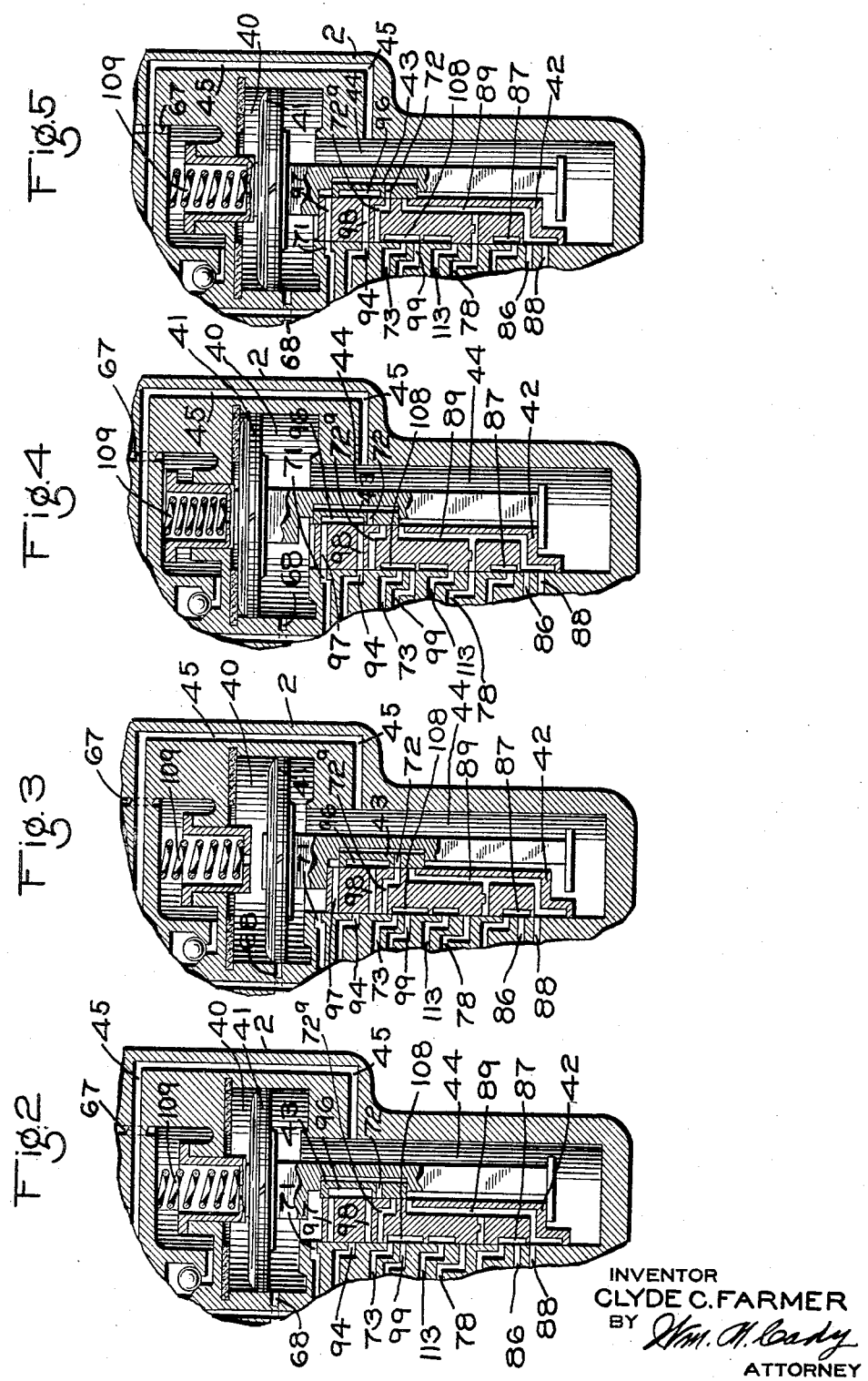

1,901,905

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed March 12, 1929. Serial No. 346,296.

This invention relates to fluid pressure brakes for railway vehicles and more particularly to means for controlling the application and release of the brakes.

In some foreign countries, especially European countries, railway car couplings are not designed to withstand shocks caused by the rapid running in of the slack of a train incident to the usual serial application of the brakes throughout the length of the train, and due to this, a too rapid application of the brakes should not be effected. In these countries it is the practice to supply the empty brake cylinder with a quick inshot of fluid under pressure in order to operate the empty brake cylinder to quickly take up the slack which may be in the brake rigging and then restrict the flow of fluid under pressure from the auxiliary reservoir to the brake cylinder or brake cylinders to such an extent that a predetermined time period, of approximately forty seconds, will elapse before full brake cylinder pressure is attained. Therefore, where the train is short it necessarily follows that, in effecting an application of the brakes, auxiliary reservoir pressure will not reduce at as fast a rate as brake pipe pressure so that when a service reduction in brake pipe pressure is effected, the triple valve piston will be moved to its emergency position, unless the graduating spring is made heavier than desirable.

The principal object of my invention is to provide a fluid pressure brake having means which, when the triple valve device operates to emergency position in effecting a service application of the brakes, will prevent a high pressure emergency build up in the brake cylinder or brake cylinders.

Other objects and advantages will appear in the following more detailed description of the invention.

In the accompanying drawings: Figure 1 is a diagrammatic view, mainly in section, of a brake equipment embodying my invention, the equipment being shown in release position; Figs. 2, 3, 4 and 5 are fragmentary sectional views showing the triple valve device in a service position, a service lap position, emergency position and emergency lap or full service position respectively.

According to my invention the brake equipment may comprise a control valve device 1, a triple valve device 2, a charging valve device 3, a quick inshot valve 4, a load cylinder cut-in valve device 5, an empty and load change-over valve 6, a release change-over valve 7, an empty brake cylinder 8, a load brake cylinder 9, a control reservoir 10, an auxiliary reservoir 11, a maintaining reservoir 12, a pilot valve device 13 and a brake pipe 14.

In the drawings of the present embodiment of the invention, the pistons and piston rods of the empty and load brake cylinders 8 and 9 respectively, and the mechanism connecting the piston rods, have not been shown since they, in themselves, form no part of this invention. However, it is to be understood that there will be a mechanism employed which will permit the piston and piston rod of the empty brake cylinder 8 to move outwardly in applying the brakes, without causing outward movement of the piston of the load brake cylinder 9. For this purpose, a mechanism may be employed which is of the same general character as that shown and described in United States Letters Patent No. 1,125,215, issued January 19, 1915, in the name of Walter V. Turner for empty and load brake apparatus.

The control valve device 1 may comprise a casing having a valve chamber 15 containing a control slide valve 16 which is carried by a stem 17 and is held to its seat by a spring pressed roller 18 and which is adapted to be operated by spaced flexible diaphragms 19, 20, 21 and 22 secured in the casing.

The flexible diaphragm 19 is clamped between one side of a follower plate 23 and one side of a follower head 24 formed on the upper end of the stem 17. The lower end of this stem is provided with a follower portion comprising spaced follower heads 25 and 26, the flexible diaphragm 20 being secured to the head 25 and the diaphragm 21 being adapted to engage the underside of the head 26.

Contained in a diaphragm chamber 27 is a follower member 28 having spaced top and bottom heads 29 and 30 respectively which are connected by a stem 31, slidably guided in a bracket 32 preferably integral with the casing. The head 29 is adapted to engage the underside of the diaphragm 21 and the head 30 engages the upper side of the diaphragm 22.

Contained in a chamber 33 at one side of the diaphragm 22 is a follower member 34 having a follower head 35 engaging the underside of the diaphragm 22, and also having a stem 36 which is slidably guided in the casing. This follower member is subject to the pressure of springs 37 which are interposed between the follower head 35 and the casing.

A chamber 38, at the upper side of the flexible diaphragm 19 contains a spring 39 which is interposed between the follower 23 and the casing.

The triple valve device 2 may comprise a casing having a piston chamber 40 connected to the brake pipe 14 and containing a piston 41, a main slide valve 42 and an auxiliary or graduating slide valve 43 operable by the piston 41 and contained in a valve chamber 44 which is connected to the auxiliary reservoir 11 by way of passage and pipe 45.

The charging valve device 3 may comprise a casing in which there is secured a flexible diaphragm 46, the chamber 47 at one side of the diaphragm containing a slide valve 48 which is adapted to be operated by a stem 49 secured at one end to the diaphragm. Contained in a chamber 50 at the other side of the diaphragm 46 is a spring pressed stop 51 with which one end of the stem 49 is adapted to engage to control the operation of the slide valve 48 as will hereinafter more fully appear.

The control reservoir 10 is constantly connected with the diaphragm chamber 27 of the control valve device 1 and the valve chamber 47 of the charging valve device 3 through a pipe and passage 52.

The load brake cylinder cut-in valve device 5 may comprise a casing containing a valve piston 53 having, at one end, a valve 54 adapted to seat against a seat ring 55 and having, at its other end, a valve 56 adapted to seat against an annular washer 57 mounted in the casing. Contained in a chamber 58, at one side of the valve piston, is a spring 59, the pressure of which is adapted to maintain the valve 54 normally seated on the seat ring 55, said chamber 58 being connected to atmosphere through a passage 60.

The quick inshot valve 4 is arranged above the valve piston and its operation is controlled by the operation of the valve piston. For the purpose of controlling the valve 4, the valve piston is provided with a centrally arranged projection 61 which is adapted to engage the lower end of the fluted stem 62 of the valve 4.

The pilot valve device 13 is for the purpose of controlling the operation of the control valve device 1 when the triple valve device is in certain positions as will hereinafter more fully appear, and may comprise a casing having a piston chamber 63 containing a piston 64 and a spring 65 which is interposed between the casing and the piston 64, said piston being adapted to operate a slide valve 93 contained in a valve chamber 66 in the casing.

In initially charging the equipment, fluid under pressure supplied to the brake pipe 14 flows to the triple valve piston chamber 40 through a passage and pipe 67, causing the piston 41 and slide valves 42 and 43 to assume their release positions as shown in Fig. 1 of the drawings, in which positions, fluid under pressure is supplied from the piston chamber 40 to the auxiliary reservoir 11 through a passage 68, past a ball check valve 69, through a choked passage 70 and passage and pipe 45. Fluid under pressure from the passage 45 also flows into the slide valve chamber 44 of the triple valve device.

With the main slide valve 42 of the triple valve device in release position, fluid under pressure from the valve chamber 44 flows to the chamber 50 of the charging valve device 4 and to the chamber 38 of the control valve device 1 by way of a passage 71. From the valve chamber 44 fluid under pressure is also supplied to the maintaining reservoir 12 by way of a port 72 in the auxiliary slide valve 43, a port 72ª in the main slide valve 42 and a passage and pipe 73.

Fluid under pressure supplied to the diaphragm chamber 50 of the charging valve device 3, through passage 71, causes the diaphragm 46 to operate to move the stem 49 and slide valve 48 toward the right, against the pressure of a spring 74. With the slide valve in its right hand or charging position, fluid under pressure flows to the chamber 27 in the control valve device 1 and to the control reservoir 10 through a restricted passage 75, valve chamber 47 in the charging valve device and passage 52.

Fluid under pressure supplied to the chamber 27 in the control valve device 1, and acting on the flexible diaphragm 22, causes said diaphragm to operate to move the follower member 34 downwardly against the pressure of the springs 37, the follower 28, due to gravity, moving downwardly with the diaphragm.

When the pressures of fluid in chambers 27 and 38 in the control valve device are substantially equal, the control valve device will be balanced, and the pressure of the spring 39 will cause the diaphragms 19, 20 and 21, stem 17 and slide valve 16 to move downwardly to their lowermost or release positions against the pressure of the springs 37, in which the chamber 15 is connected to atmosphere by way of a cavity 76 in the slide valve 16 and a choked passage 77.

When the pressure of fluid in the valve chamber 47 in the charging valve device is substantially equal to the pressure of fluid in the diaphragm chamber 50, the pressure of the spring 74 causes the stem 49 to operate to return the slide valve 48 to its normal position, in which the passage 75 is lapped, thus closing off further supply of fluid under pressure to the control reservoir 10 and chamber 27 in the control valve device.

With the triple valve device 2 and control valve device 1 in their release positions, the empty brake cylinder 8 is connected to the atmosphere by way of pipe and passage 78, valve chamber 15 in the control valve device, cavity 76 in the slide valve 16 and passage 77, and since the piston chamber 63 in the pilot valve device 13 is connected to the passage 78 by a passage 79, it is also connected to atmosphere. The load brake cylinder 9 is connected to atmosphere by way of pipe and passage 80, a passage 81 in the change-over valve 6, a passage 82, past the normally unseated valve 56, through chamber 58 and passage 60.

With the main slide valve 42 of the triple valve device in release position, two quick service chambers 83 and 84, which are connected through a restricted passage 85, are connected to atmosphere by way of a passage 86, a cavity 87 in the slide valve 42, a passage 88, a valve chamber 120 containing the quick inshot valve 4, past the unseated valve 4 and from thence through passage 78 to atmosphere, as described in connection with the venting of the empty brake cylinder 8. Since the passage 88 leads to the valve chamber 66 of the pilot valve device 13, said chamber will also be connected to atmosphere.

From the foregoing description it will be seen that the equipment is fully charged and is in normal release position in which the brake cylinders 8 and 9 are both vented to atmosphere.

A service application of the brakes is effected by making a gradual reduction in the pressure of fluid in the brake pipe 14 in the usual manner and consequently in the piston chamber 40 in the triple valve device 2. Fluid under pressure in the valve chamber 44 from the auxiliary reservoir 11, acting on the underside of the piston 41, causes said piston to operate to shift the auxiliary slide valve 43 and main slide valve 42 upwardly toward their service positions. When the main slide valve is in a service position as shown in Fig. 2 of the drawings, fluid under pressure from the auxiliary reservoir 11 and connected valve chamber 44 in the triple valve device is supplied to the valve chamber 66 in the pilot valve device 13 by way of a port 89 in the main slide valve 42, said port having been uncovered by the auxiliary slide valve 43 during its initial upward movement relative to the main slide valve and through passage 88. From the passage 88, fluid under pressure also flows to the empty brake cylinder 8 through valve chamber 120 past the unseated quick inshot valve 4 and its fluted stem 62, and through passage and pipe 78. From the passage 78 fluid under pressure also flows to the piston chamber 63 in the pilot valve device 13.

In practice, the passage 78 under the quick inshot valve 4 will be of less diameter than the service port 89 in the main slide valve 42 and the passage 88, so that as soon as the slide valve 42 reaches its service position, the pressure of fluid will be quickly built up in the valve chamber 66 in the pilot valve device 13, and this pressure acting on one side of the piston 64 causes said piston and slide valve 93 to move to their right hand positions against the pressure of the spring 65 and the pressure of fluid being supplied at a restricted rate to the chamber 63 through the passages 78 and 79. With the slide valve 93 in this position fluid under pressure from the valve chamber 66 is supplied to a passage 94 leading to the seat of the slide valve 42 of the triple valve device by way of a port 95 in the slide valve 93.

Fluid under pressure from the passage 78 also flows through a passage 90 to the inner seated area of the valve piston 53 of the load cut-in valve device 5, and when the pressure of fluid, acting on this area builds up to a predetermined degree, the valve piston 53 is forced downwardly against the pressure of the spring 59, unseating the valve 54 and seating the valve 56. When the valve piston is thus forced downwardly, the quick inshot valve 4, due to gravity, moves downwardly with it and seats, thus closing off the flow of fluid past the valve 4 from the valve chamber 89 to the passage 78.

With the quick inshot valve 4 thus seated fluid under pressure will flow to the empty brake cylinder 8 by way of passage 88, quick inshot valve chamber 120, a passage 91, a restricted passage 92 in the change-over valve 6 and passage and pipe 78. From the passage 78, fluid under pressure will flow to the load brake cylinder 9 through the restricted passage 90, past the unseated valve 54, through passage 82, passage 81 in the change-over valve 5 and passage and pipe 80.

When the rate of reduction in brake pipe pressure does not exceed the rate of reduction in the auxiliary reservoir pressure, the triple valve piston 41 and slide valves 42 and 43 will come to a stop in the service position, as shown in Fig. 2 of the drawings, without compressing the spring 109 which is contained in the piston chamber 40.

Since the diaphragm chamber 38 of the control valve device 1 is connected to the valve chamber 44 of the triple valve device 2, by way of the passage 71, when the triple valve parts are in the service position, as shown in Fig. 2, the pressure of fluid in the chamber 38 reduces with the pressure of fluid in the auxiliary reservoir, and as the pressure is thus reduced in chamber 38, the pressure of fluid in the chamber 27, as supplied from the control reservoir 10, acting on the diaphragm 21, causes the diaphragm to flex upwardly, shifting the stem 17 and slide valve 16 to lap position, in which the slide valve 21 closes communication from the chamber 15 to the atmospheric passage 77, and in which a passage 99 which is connected by a cavity 108 in the main slide valve 42 of the triple valve device with the passage 73 leading from the maintaining reservoir 12. Now when the pressure of fluid supplied to the chamber 15 through the brake cylinder passage 78, is sufficient to balance the forces acting on the flexible diaphragms of the control valve device, the upward movement of the slide valve 16 will be stopped in its middle or lap position.

When the pressure of fluid in the valve chamber 44 of the triple valve device is slightly less than the pressure of fluid in the piston chamber 40, the triple valve piston and auxiliary slide valve 43 will be shifted rearwardly to lap position, as shown in Fig. 3, in which position, the graduating slide valve laps the port 89 in the main slide valve 42, thus closing off the further supply of fluid from the auxiliary reservoir to the brake cylinders.

Should the brake cylinder pressure in the valve chamber 15 of the control valve device be reduced by leakage of fluid from the brake cylinders, the pressure of fluid in the chamber 27, acting on the diaphragm 21, causes the control valve device to operate to its uppermost position, in which the slide valve maintains the atmospheric passage 77 lapped and uncovers passage 99, so that fluid under pressure flows from the maintaining reservoir 12 to the brake cylinders by way of pipe and passage 73, cavity 108 in the main slide valve 42 of the triple valve device, passage 99, chamber 15 of the control valve device and passage 78. Now when the pressure of fluid in the chamber 15 is increased, the control valve device again operates to lap position. It will thus be seen that brake cylinder pressure is maintained by fluid under pressure from the maintaining reservoir 12.

Just before the pressures of the auxiliary reservoir and brake cylinders equalize, the pressure of the spring 65 of the pilot valve device 13 shifts the pilot valve piston 64 and slide valve 93 to their left hand position, in which a cavity 110 in the slide valve 93 establishes communication from the passage 94 to a passage 111 leading to the atmosphere. Since the passage 94 is lapped by the main slide valve 42 when said valve is in the position shown in Fig. 2, the connecting of the passage 94 to the atmosphere will have no effect upon the brake application.

When an emergency reduction in brake pipe pressure is effected, the pressure of fluid in the valve chamber 44 of the triple valve device, as supplied from the auxiliary reservoir 11, causes the triple valve piston 41 and slide valves 42 and 43 to move to their uppermost or emergency position, as shown in Fig. 4 of the drawings, against the pressure of the spring 109.

With the slide valves 42 and 43 thus shifted to emergency position, a cavity 96 in the auxiliary slide valve 43 connects ports 97 and 98 in the main slide valve 42, which ports have been brought into registration with the passages 71 and 94 respectively.

With triple valve parts in emergency position, fluid under pressure flows from the auxiliary reservoir 11 to the brake cylinders and to the chambers 63 and 66 of the pilot valve device in the same manner as described in connection with a service application of the brakes.

Since the pressure of fluid in the chamber 38 reduces with the pressure of fluid in the auxiliary reservoir, the control valve device will be caused to operate to lap the atmospheric passage 77 in the same manner as described in connection with a service application.

Fluid under pressure supplied to the piston chamber 66 of the pilot valve device causes the pilot valve piston to operate to shift the slide valve 93 to its extreme right hand position, in which the port 95 registers with the passage 94, thus connecting the piston chamber 66 to the diaphragm chamber 38 of the control valve device 1 and to the chamber 50 of the valve device 3, so that these chambers 38 and 50 are maintained charged with fluid under pressure.

Just before the auxiliary reservoir pressure and brake cylinder pressure equalize, the pressure of the spring 65 moves the pilot valve piston and consequently the slide valve 93 to the extreme left hand position, as shown in Fig. 1, in which the cavity 110 connects the passage 94 to the atmospheric passage 111, so that fluid under pressure is now discharged from the chambers 38 and 50 of the control valve device 1 and valve device 3 respectively.

With the chamber 38 of the control valve device 1 thus vented, the pressure of fluid in the chamber 27, together with the pressure of the springs 37 cause the diaphragms to flex upwardly, carrying the slide valve 16 from lap position to its uppermost position, in which the atmospheric passage 77 is lapped and the passage 99 is uncovered. With the passage uncovered, fluid under pressure flows from the maintaining reservoir 12 to the brake cylinder by way of pipe and passage 73, cavity 108 in the main slide wave 42 of the triple valve device, passage 99, chamber 15 of the control valve device and passage 78.

With the chamber 50 of the valve device 3 vented to the atmosphere, the pressure of fluid in the valve chamber 47, as supplied from the control reservoir 10, together with the pressure of the spring 74, causes the diaphragm 46 to move toward the left hand shifting the slide valve 48 to a position in which it uncovers the passage 75. Fluid under pressure now flows from the control reservoir to the brake cylinders by way of passages 75 and 45 and the communication established by the triple valve device. From the passage 45, fluid also flows to the brake cylinders, past the ball check valves 100 and 101, through passages 102, 103, 104 and 99, chamber 15 of the control valve device and brake cylinder passage 78.

It will be seen from the above description, that the pressures of fluid in the auxiliary reservoir 11, maintaining reservoir 12 and control reservoir 10, equalize into the brake cylinders, thus insuring high brake cylinder pressure in emergency.

In effecting a service application of the brakes on a train, especially on a short train or at the head end of a long train where the rate of reduction in brake pipe pressure may exceed the rate at which the auxiliary reservoir is reduced by the flow of fluid from the reservoir to the brake cylinders, the triple valve piston and slide valves 42 and 43 do not remain in the service position shown in Fig. 2 but continue to move outwardly to emergency position, as shown in Fig. 4.

With the triple valve parts moved to emergency position in effecting a service application, fluid under pressure is supplied from the auxiliary reservoir to the brake cylinders and to the chambers 63 and 66 of the pilot valve device in the same manner as before described in connection with the effecting of an emergency application of the brakes.

The pressure of fluid in the chamber 38 of the control valve device reduces with the pressure of fluid in the auxiliary reservoir, so that the control valve device operates to shift the slide valve 16 to its middle or lap position to close the atmospheric port 77. This operation is the same as above described in connection with the effecting of an emergency application of the brakes.

As before described in connection with the effecting of an emergency application of the brakes, fluid under pressure supplied to the pilot valve device 13 causes the piston 64 and consequently the slide valve 93 to be moved toward the right hand to such a position that the port 95 in the slide valve registers with the passage 94, so that fluid under pressure supplied to the valve chamber 66 flows to the chambers 38 and 50 of the control valve device 1 and valve device 3 respectively, by way of the passage 94, port 98 in the main slide valve 42 of the triple valve device, cavity 96 in the auxiliary slide valve 43, port 97 in the main slide valve and passage 71; thus maintaining these chambers charged with fluid under pressure.

If the brake pipe reduction does not exceed a full service reduction, then when the auxiliary reservoir pressure has reduced to substantially that of the brake pipe, the pressure of the spring 109 will move the triple valve piston 41 and auxiliary slide valve 43 inwardly to emergency lap position, as shown in Fig. 5 of the drawings, in which position, communication between the passages 71 and 94 by way of the cavity 96 in the slide valve 43 and the ports 97 and 98 in the main slide valve 42 is cut off and the chamber 38 of the control valve device and the chamber 50 of the valve device 3 are in direct communication with the valve chamber 44 of the triple valve device through the port 97 in the main slide valve 42 and passage 71.

Now, just before the pressure of fluid in the piston chamber 63 of the pilot valve device becomes equal to the pressure of fluid in the valve chamber 66, the spring 65 which has been compressed acts to shift the pilot valve piston 64 and slide valve 93 to the position, as shown in Fig. 1, in which position, the cavity 110 in the slide valve 93 again establishes communication from the passage 94 to the atmospheric passage 111. Since the communication between the passages 71 and 94 has been previously closed off by the movement of the auxiliary slide valve 43 of the triple valve device to emergency lap position, the connecting of the passage 94 to the atmosphere will have no effect upon the brake application.

It will here be noted that with the triple valve device in emergency lap position, the cavity 108 in the main slide valve 43 connects the passages 73 and 99, so that if the brake cylinder pressure should be unintentionally reduced and the slide valve 16 of control valve device is caused to operate to uncover the passage 99, fluid under pressure will be supplied from the maintaining reservoir to the brake cylinders, thus maintaining brake cylinder pressure to that desired.

To release the brakes after either of the above mentioned service applications or after an emergency application, the pressure of fluid in the brake pipe 14 is increased in the usual manner, causing the triple valve device 2 to be moved to release position, in which the auxiliary reservoir 11 and chamber 38 of the control valve device 1 are recharged. The recharging of the chamber 38 causes the control valve device to be unbalanced so that the pressure of fluid in this chamber, acting on the flexible diaphragm 19, will cause the control slide valve 16 to be shifted downwardly to release position, in which the brake cylinders are vented to atmosphere by way of pipe and passage 78, diaphragm chamber 15, cavity 76 in the control slide valve 16 and passage 77.

When the load brake cylinder pressure and above the valve piston 53 has reduced to a predetermined degree, the pressure of the spring 59 of the load cylinder cut-in valve device 5 will cause the valve piston 53 to move upwardly and seat the valve 54 on the seat ring 55. As the valve piston is thus moved, the valve 56 is unseated, so that the remaining fluid under pressure in the load brake cylinder 9 flows to atmosphere by way of pipe and passage 80, passage 81 in the change-over valve 6, passage 82, past the unseated valve 56, and through chamber 58 and passage 60. It will be noted that fluid under pressure from the empty brake cylinder 8 continues to flow to atmosphere by way of passage 77 in the control valve device as described.

To effect a graduated release of the brakes, the release change-over valve 7 must be in the position shown in Fig. 1 of the drawing and to effect a direct release the valve 7 is rotated so that the passage 103 therethrough will be out of registration with the passages 102 and 104 and a passage 112 in the valve will be in registration with a passage 113 leading from the seat of the triple valve slide valve 42 and a passage 114 leading to atmosphere.

The effecting of a graduated or direct release of the brakes will be accomplished in substantially the same manner as described in my pending application for Letters Patent filed March 11, 1929, and serially numbered 346,020 for fluid pressure brake.

When operating empty cars, it is desirable, for well known reasons, to render the load brake cylinder inoperative, and for this purpose I provide the empty and load change-over valve 6.

As shown in Fig. 1 of the drawings the load cylinder 9 is cut in, and in order to cut it out, the valve 6 is rotated to a position in which the passage 81 therethrough is out of registration with the passages 80 and 82, and the passage 92 is out of registration with the passages 78 and 91, so that the flow of fluid under pressure to the brake cylinders through these valve passages is closed off. However, when the valve is thus rotated, a restricted passage 115 in the valve is brought into registration with the passages 78 and 91, so that in effecting an application of the brakes, fluid under pressure will flow from passage 91, to the empty brake cylinder 8 by way of the quick inshot valve chamber 120, past the unseated quick inshot valve 4 and its fluted stem 62 and passage and pipe 78. After the quick inshot of fluid under pressure to the empty brake cylinder the valve piston 53 will move downwardly permitting the quick inshot valve 4 to seat. Fluid under pressure is now supplied to the empty brake cylinder by way of the valve passage 115.

The passage 115 is restricted to such an extent that it will require substantially the same period of time to effect an application of the brakes with the empty brake cylinder alone as it requires to effect an application with both brake cylinders.

From the foregoing description, it will be seen that in effecting an emergency application of the brakes, the triple valve parts are moved to and maintained in emergency position and that the pilot valve device 13 operates to control the operation of the control valve device 1 and valve device 3 to supply fluid under pressure to the brake cylinders at high pressure. When in effecting a service application of the brakes the rate of reduction in brake pipe pressure exceeds the reduction in auxiliary reservoir pressure, the triple valve parts move to emergency position and then to emergency lap position before the pilot valve device 13 operates to effect the operation of the control valve device 1 and valve device 3 to supply fluid under pressure to the brake cylinder, thus preventing high brake cylinder pressure when the triple valve parts move to emergency position in effecting a service reduction in brake pipe pressure.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake cylinder, a valve means operative to supply fluid under pressure to the brake cylinder in effecting an emergency application of the brakes, a triple valve device operative to emergency position and then to emergency lap position in effecting a service application of the brakes, and means controlled by said triple valve device for preventing the operation of said valve means to supply fluid under pressure to the brake cylinder when said triple valve device is in emergency position in effecting a service application of the brakes.

2. In a fluid pressure brake, the combination with a brake cylinder, of valve means operative to supply fluid under pressure to the brake cylinder in effecting an emergency application of the brakes, a triple valve device operative to emergency position and then to emergency lap position in effecting a service application of the brakes, and a valve device operative when the triple valve device is operated in effecting a serivce application of the brakes for preventing the operation of said valve means to supply fluid under pressure to the brake cylinder.

3. In a fluid pressure brake, the combination with a brake cylinder, of valve means operative to supply fluid under pressure to the brake cylinder in effecting an emergency application of the brakes, a triple valve device operative to emergency position and then to emergency lap position in effecting a service application of the brakes, and a valve device operative by fluid under pressure supplied by said triple valve device when said triple valve device is operated to effect an application of the brakes for preventing the operation of said valve means to supply fluid under pressure to the brake cylinder unless an emergency application has been initiated.

4. In a fluid pressure brake, the combination with a brake pipe, a brake cylinder, and an auxiliary reservoir, of valve means operative to supply fluid under pressure to the brake cylinder in effecting an emergency application of the brakes, a triple valve device operative by fluid under pressure from the auxiliary reservoir upon effecting a service reduction in brake pipe pressure to supply fluid under pressure to the brake cylinder and operative to emergency lap position when the pressure of fluid from the auxiliary reservoir and acting on said triple valve device reduces to substantially the pressure of fluid in the brake pipe, and means operative by fluid under pressure supplied by said triple valve device for preventing the operation of said valve means to supply fluid under pressure to the brake cylinder when said triple valve is in emergency position in effecting a service application of the brakes.

5. In a fluid pressure brake, the combination with a brake pipe and a brake cylinder, of a triple valve device operative to emergency position to supply fluid under pressure to the brake cylinder and then to emergency lap position when a service reduction in brake pipe pressure is effected and operative to emergency position to supply fluid under pressure to the brake cylinder when an emergency reduction in brake pipe pressure is effected, valve means operative to also supply fluid under pressure to the brake cylinder in effecting an emergency application of the brakes, and means for preventing said valve means from operating to supply fluid under pressure to the brake cylinder when said triple valve device is in emergency position in effecting a service application of the brakes.

6. In a fluid pressure brake, the combination with a brake pipe and a brake cylinder, of a triple valve device operative to emergency position to supply fluid under pressure to the brake cylinder and then to emergency lap position when a service reduction in brake pipe pressure is effected and operative to emergency position to supply fluid under pressure to the brake cylinder when an emergency reduction in brake pipe pressure is effected, valve means operative to also supply fluid under pressure to the brake cylinder in effecting an emergency application of the brakes, and a valve included in said triple valve device and a valve device operative to prevent said valve means from operating to supply fluid under pressure to the brake cylinder in effecting a service application of the brakes.

7. In a fluid pressure brake, the combination with a brake pipe and a brake cylinder, of a triple valve device operative upon effecting a service reduction in brake pipe pressure to emergency position to supply fluid under pressure to the brake cylinder and then to emergency lap position and operative upon effecting an emergency reduction in brake pipe pressure for supplying fluid under pressure to the brake cylinder, valve means operative to supply fluid under pressure to the brake cylinder in effecting an emergency application of the brakes, and a pilot valve device controlled by said triple valve device operative to one position to cause said valve means to operate to supply fluid under pressure to the brake cylinder and to another position to prevent the operation of said valve means to supply fluid under pressure to the brake cylinder until said triple valve device operates to emergency lap position in which position, said triple valve device prevents the operation of said valve means.

8. In a fluid pressure brake, the combination with a brake pipe, a brake cylinder, and an auxiliary reservoir, of a valve device having a chamber charged with fluid under pressure from the auxiliary reservoir and operative upon the reduction in the pressure of fluid in said chamber for supplying fluid at high pressure to the brake cylinder in effecting an emergency application of the brakes, a pilot valve device having a position for reducing the pressure of fluid in said chamber and having a position for maintaining the pressure of fluid in said chamber, and means in said triple valve device for controlling the operation of said pilot valve device and said valve device.

9. In a fluid pressure brake, the combination with a brake pipe, a brake cylinder, and an auxiliary reservoir, of a valve device having a chamber charged with fluid under pressure from the auxiliary reservoir and operative upon the reduction in the pressure of fluid in said chamber for supplying fluid at high pressure to the brake cylinder in effecting an emergency application of the brakes, a pilot valve device having a position for reducing the pressure of fluid in said chamber and having a position for maintaining the pressure of fluid in said chamber, and a plurality of valves included in said triple valve device operative to control the operation of said pilot valve device and said valve device.

10. In a fluid pressure brake, the combination with a brake pipe, a brake cylinder, and an auxiliary reservoir, of a valve device having a chamber charged with fluid under pressure from the auxiliary reservoir and operative upon the reduction in the pressure of fluid in said chamber for supplying fluid at high pressure to the brake cylinder in effecting an emergency application of the brakes, a pilot valve device having a position for reducing the pressure of fluid in said chamber and having a position for maintaining the pressure of fluid in said chamber, and a plurality of slide valves included in said triple valve device adapted to cooperate to control the operation of said pilot valve device and said valve device.

11. In a fluid pressure brake, the combination with a brake pipe and a brake cylinder, of a triple valve device operative to emergency position to supply fluid under pressure to the brake cylinder and then to emergency lap position when a service reduction in brake pipe pressure is effected and operative to emergency position to supply fluid under pressure to the brake cylinder when an emergency reduction in brake pipe pressure is effected, valve means operative to also supply fluid under pressure to the brake cylinder in effecting an emergency application of the brakes, and means for delaying the operation of said valve means to supply fluid under pressure to the brake cylinder.

12. In a fluid pressure brake, the combination with a brake pipe and a brake cylinder, of valve means operative to provide a high brake cylinder pressure build up in effecting an emergency application of the brakes, a triple valve device operative to emergency position and to emergency lap position in effecting a service application of the brakes and operative to emergency position to effect an emergency application of the brakes, and means controlled by the triple valve device for preventing the operation of said valve means to supply fluid under pressure to the brake cylinder when a service application of the brakes is effected.

13. In a fluid pressure brake, the combination with a brake pipe, a brake cylinder, and an auxiliary reservoir, of a valve device having a chamber charged with fluid under pressure and operative upon a reduction in the pressure of fluid in said chamber for supplying fluid under pressure to the brake cylinder in effecting an emergency application of the brakes, a triple valve device operative to emergency position to supply fluid under pressure to the brake cylinder to effect a service application of the brakes and operative to emergency lap position when the auxiliary reservoir pressure is reduced to substantially the pressure of fluid in the brake pipe, and a pilot valve device operative by fluid under pressure supplied by said triple valve device for preventing said valve device from operating to supply fluid under pressure to the brake cylinder while said triple valve device is in emergency position in effecting a service application of the brakes.

14. In a fluid pressure brake, the combination with a brake pipe, a brake cylinder, and an auxiliary reservoir, of a valve device having a chamber charged with fluid under pressure and operative upon a reduction in the pressure of fluid in said chamber for supplying fluid under pressure to the brake cylinder in effecting an emergency application of the brakes, a triple valve device operative to emergency position to supply fluid under pressure to the brake cylinder to effect a service application of the brakes and operative to emergency lap position when the auxiliary reservoir pressure is reduced to substantially the pressure of fluid in the brake pipe, and a pilot valve device subject to auxiliary reservoir pressure, brake cylinder pressure and the pressure of a spring for preventing said valve device from operating to supply fluid under pressure to the brake cylinder while the triple valve device is in emergency position until the brake cylinder pressure and auxiliary reservoir pressures in said pilot valve device are substantially equal.

15. In a fluid pressure brake, the combination with a brake pipe, auxiliary reservoir, and brake cylinder, of a valve device operated upon a reduction in brake pipe pressure for supplying fluid under pressure from the auxiliary reservoir to the brake cylinder and having an emergency application position and means operated in the emergency position of said valve device upon substantial equalization of the auxiliary reservoir and brake cylinder pressures for effecting an emergency application of the brakes.

16. In a fluid pressure brake, the combination with a brake pipe, auxiliary reservoir, and brake cylinder, of a triple valve device operated upon a reduction in brake pipe pressure for supplying fluid under pressure from the auxiliary reservoir to the brake cylinder and having an emergency application position, a valve device subject to the opposing pressures of the auxiliary reservoir and the brake cylinder, and means controlled by said valve device in the emergency position of the triple valve device for effecting an emergency application of the brakes upon substantial equalization of the brake cylinder and auxiliary reservoir pressures.

17. In a fluid pressure brake, the combination with a brake pipe and a brake cylinder, of a triple valve device operative to emergency position upon effecting a full service reduction in brake pipe pressure for supplying fluid under pressure to the brake cylinder and operative to close off the supply of fluid under pressure to the brake cylinder when a full service application has been effected and operative upon effecting a reduction in brake pipe pressure in excess of a full service reduction for supplying fluid under pressure to the brake cylinder in effecting an emergency application of the brakes, valve means operative to supply fluid at high pressure to said brake cylinder in effecting an emergency application, and means for preventing the operation of said valve means to supply fluid under pressure to the brake cylinder when a service reduction in brake pipe pressure is effected.

In testimony whereof I have hereunto set my hand, this 26th day of February, 1929.

CLYDE C. FARMER.